Patented Nov. 21, 1933

1,935,666

UNITED STATES PATENT OFFICE 1,935,666

PETROLEUM SULPHONIC ACIDS, COMPOSITIONS CONTAINING SAID ACIDS AND PROCESS OF PREPARING THE SAME

Kolachala Seeta Ramayya, Brooklyn, N. Y., assignor to L. Sonneborn Sons, Inc., a corporation of New York No Drawing. Application November 12, 1930
Serial No. 495,305

14 Claims. (Cl. 252—1)

My process is applicable to the said acids either in free condition or combined with bases, and the term "sulphonic acids" may be hereinafter generically employed in the description and claims to designate the said acids in both free and combined state.

Certain highly refined petroleum products, such as for example white lubricating oils, medicinal oils and certain grades of transformer oil, are produced by the treatment of a petroleum distillate with fuming sulphuric acid. The distillate so treated is ordinarily a lubricating oil distillate, that is its viscosity is higher than the viscosity ordinarily found in gas oil distillates, and its average boiling point is higher than the average boiling point of gas oils. In treating a distillate of the type described, it is ordinarily mixed and agitated with a batch of fuming sulphuric acid. The concentration of fuming acid employed may vary from several percent of uncombined $SO_3$ up to pure sulphuric anhydride, and all such concentrations, including the anyhydride, may be hereinafter embraced by the term "fuming sulphuric acid". The amount of fuming sulphuric acid applied may vary for any individual treat from 3 to about 20% by volume of the original quantity of oil treated. After agitating the distillate and acid together, the mixture is permitted to settle; whereupon a heavy greenish to black colored sludge separates as a lower layer and may be withdrawn. This sludge contains unconsumed sulphuric acid together with certain organic acids derived from the interaction of the fuming sulphuric acid with the oil. These organic acids may compose from 25 to 75% of the total sludge, depending upon the oil treated, mode of treatment and number of previous treats. The sludge organic acids are only limitedly soluble in hydrocarbon oils, if at all, but are highly water soluble. The free acids in aqueous solution are dark green in color, and for this reason these acids are generally referred to as green petroleum sulphonic acids. The green petroleum sulphonic acids are at times produced by the action of strong sulphuric acid (non-fuming), for example of from 98 to 100%, $H_2SO_4$ content, on certain lubricating oil distillates and in relatively impure form may be separated from the sludge thereby produced by a process of water washing.

The fuming sulphuric acid treatment simultaneously produces other types of sulphonic acids which are predominantly oil soluble, and may be found in the supernatant oil to the extent of a few percent after each treat and separation of sludge. These acids impart a reddish color to the oil containing the same, and for this reason are generally referred to as "mahogany petroleum sulphonic acids". The mahogany petroleum sulphonic acids may be extracted from the oil containing the same at the expiration of each acid treat, but in commercial practice are ordinarily separated at one or two stages in the succession of sulphuric acid treatments. The point of separation is ordinarily determined by commercial considerations concerning the quality of finished oil required and the economy and ease of treatment. The mahogany sulphonic acids are also produced at times by the action of strong (non-fuming) sulphuric acid, say of from 98 to 100%, $H_2SO_4$ content, on certain lubricating oil distillates, although for commercial reasons they are not usually recovered from such treatment in usable form.

After separation of the sludge hereinbefore referred to, the mahogany sulphonic acids are in commercial practice usually selectively extracted from the hydrocarbon oil containing the same by admixing the oil with a solvent consisting of an aqueous solution of a mono hydroxyl alcohol of not exceeding 3 carbon atoms. The water must be present in sufficient amount to render the alcoholic solution substantially immiscible in the oil, and in practice a solution containing from 40 to 60% of alcohol is preferred, although a solution containing from 25 to 75% may be employed if desired.

The mahogany sulphonic acids pass principally into the alcoholic solution, and after settling and stratification the alcoholic solution containing the organic acids may be withdrawn. In the preferred practice, the mahogany sulphonic acids are ordinarily neutralized at or prior to the application of the alcoholic solution with the formation of inorganic salts thereof. Bases forming water soluble salts, such as ammonia and sodium carbonate or hydroxide, are preferred for this purpose.

As hereinabove stated, the green sulphonic acids either free or combined are only limitedly soluble, if at all, in hydrocarbon oils. I have found, however, that the green petroleum sulphonic acids may be caused to become soluble in hydrocarbon oils by incorporating the same with mahogany petroleum sulphonic acids hereinbefore described. This may be accomplished by thoroughly admixing and homogenizing the two types of acids. The degree of incorporation or admixing to which I refer is not a mere mixture of separate particles of each acid, but a complete homogenization. The amount of the mahogany sulphonic acids should be at least equal by weight to 5% of the mixture. In general, the advantages are in a measure proportional to the amount of the mahogany acids present, that is the more mahogany acids present the greater the amount of the green acids which will be carried into solution in any particular organic solvent, which solvent is freely soluble in hydrocarbon oils. Where the mixture is to be dissolved in a lubricating oil distillate, I prefer to have at least 30% of the mahogany acids present. The amount required will vary to some extent with the composition of the lubricating oil distillate. Where the mixture is to be dissolved in organic solvents which are miscible with hydrocarbon oils, a lesser quantity of the mahogany acids may be sufficient. In general, it may be stated that the properties of the mixture are greater than indicated from the known properties of the components individually. For purposes of definition, I may state that of the total sulphonic acids present from 10 to 90% may consist of the mahogany acids. For best results the mixture is substantially dry although a few percent of water may be tolerated. In general, for the mixture to retain the capacity to dissolve in oil and to impart emulsifyability to the oil, water should not be present to a greater extent than 30% of the total. As previously stated, the term "acids" is generically employed to denote both the free acids and the acids combined with bases. The preferred method of homogenizing or incorporating the two acids consists in dissolving them in a common solvent with such mixing as is necessary to thoroughly distribute the same. Where the recovery or concentration of the mixture is desired, this may be followed by the evaporation of at least part of the solvent. This homogenization may be accomplished, for example, by mixing the two sulphonic acids in one batch of solvent in which both are soluble, or by mixing the two sulphonic acids in two different batches of solvent and thereafter commingling the two batches. It is, of course, feasible to dissolve the green sulphonic acids in one solvent and to dissolve the mahogany sulphonic acids in a different solvent and thereafter to admix the two, provided the solvents employed are miscible with each other. After admixing the two sulphonic acids in this manner, the solvent is preferably evaporated off to leave a substantially dry product. As hereinabove stated, this should not, in any event, contain more than 30% of water.

The preferred solvent for this purpose is an aqueous solution of a mono hydroxyl alcohol of not exceeding 3 carbon atoms to the molecule. The water may be present to the extent of from 25 to 75% by volume of the alcohol and water. After mixing the two sulphonic acids in such an alcoholic solution, the solution is evaporated off to leave as a residue the mixture of sulphonic acids, preferably dry, and in any event containing not more than 30% of water.

The green sulphonic acids, as found originally in the sludge produced by the fuming acid treatment of a lubricating oil distillate, are contaminated with considerable unconsumed sulphuric acid which should be removed. One feasible method consists in dissolving the sludge in water and salting out the organic components by adding concentrated muriatic acid. This leaves the sulphuric acid largely in the aqueous solution and may be repeated until green sulphonic acids have been prepared which are substantially free from sulphuric acid. Any muriatic acid remaining in the sulphonic acids may be eliminated by heating. The green sulphonic acids also contain certain non-acid organic impurities; these may consist of higher alcohols, disulphids, mercaptans, mustard oils, hydrocarbons, compounds of asphaltic nature, thio-ethers, thio-alcohols and other materials of non-sulphonic nature. The non-acid organic impurities are only limitedly soluble in an aqueous alcoholic solution of the type referred to and may be substantially eliminated by dissolving the green sulphonic acids in such an aqueous alcoholic solution, settling and rejecting any non-acid organic compounds which separate the solution.

I am aware of the fact that the green petroleum sulphonic acids have previously been separated into two components, including an organic acid which is predominantly water soluble and an organic acid which when isolated is not highly soluble in water. Such acids cannot, however, be separated one from the other by the use of an aqueous alcoholic solution. The non-acid organic compounds referred to by me do not belong to the sulphonic acids mentioned, but are distinct and different compounds.

In practice, I prefer to employ the green petroleum sulphonic acids combined with a base and to solubilize the same by the use of mahogany sulphonic acids also combined with a base. The salts of the alkali metal bases have been found particularly suitable to my purpose.

The sodium salt of the green petroleum sulphonic acids is preferably prepared from the sludge produced on treating a lubricating oil distillate with fuming sulphuric acid, in the following manner:

A batch of sludge is admixed with an equal volume of water and permitted to stand until two liquid phases are produced. Stratification may be facilitated by heating the solution for a period, and it is at times helpful to heat the mixture and then cool the same. Cooling to temperatures between 0 and 30° C. accelerates separation. The lower phase contains the bulk of the sulphuric acid originally present and may be concentrated or utilized in any suitable manner. The upper phase contains the green petroleum sulphonic acids and is subjected to further treatment. The solution is now neutralized with caustic soda and the amount of water added either separately or in the caustic solution is so regulated that the percentage of solids present is from 25 to 60% of the total. A mono hydroxyl alcohol of not exceeding 3 carbon atoms, preferably ethyl alcohol, is now added to the liquid phase containing the green sulphonic acids until the volume of alcohol is sufficient to make the ratio of alcohol to water in the mixture approximately equal to one. After thorough mixing the mixture is permitted to settle for a few hours, during which stratification takes place, resulting in the formation of a lower heavier phase consisting of non-acid organic compounds with inorganic compounds dispersed therein. The alcoholic solution of sodium petroleum sulphonates is carefully separated by decantation.

In commercial practice the sodium salts of the mahogany sulphonic acids are directly obtained by extracting the mahogany sulphonic acids from the treated lubricating oil distillate with an aqueous alcoholic solution preferably containing from 40 to 60% of a mono hydroxyl alcohol of not exceeding 3 carbon atoms. Neutralization is effected by adding caustic soda to the oil or to the mixture of oil and alcoholic solution.

The two sodium petroleum sulphonates may be combined by commingling the alcoholic solution of the mahogany sulphonates so obtained with the alcoholic solution of the sodium salt of the green sulphonic acids prepared, as hereinbefore described. After properly mixing the two solutions the solvent is distilled off, leaving a homogeneous mixture of the two sulphonates which is freely soluble in hydrocarbon oils. This mixture is preferably substantially dry, and in any event the distillation of the solvent should be continued until not more than 30% of water is present in the residual sodium petroleum sulphonates. It is immaterial to the novelty or utility of my invention whether the solution of the solvents in hydrocarbon oils which I produce is a true or colloidal solution. The fact remains that the solution thereby produced is new and is susceptible of certain highly advantageous commercial utilizations.

In one specific example, I took a 50% solution of ethyl alcohol and water containing 30 parts by weight of the sodium salt of the green petroleum sulphonic acids and mixed the same with 75 parts of the sodium salt of the mahogany petroleum sulphonic acids dissolved in 125 parts by weight of a 50% solution of ethyl alcohol and water. Upon mixing the two solutions and distilling off the alcohol and water, I recovered a homogeneous mixture of the two sulphonates which was freely soluble in hydrocarbon oils.

When the mixture which I have produced is dissolved in hydrocarbon oils, preferably to the extent of from 2 to 20% of the total, the oil is thereby rendered emulsifiable. A larger proportion than 20% may be added if desired. In general, the emulsions so produced are characterized by exceptional stability and fineness of dispersion and the result is, in general, attained with less expense than would be required if the emulsification were produced solely by the use of the mahogany acids or sulphonates thereof. The superior emulsifying characteristics of my mixture may be due to the fact that it contains components, one of which is highly soluble in the oil phase, and one of which is highly soluble in the aqueous phase.

The foregoing specific example is intended merely as an illustration and not as a limitation of the invention. It is therefore my intention that the invention be limited only by the appended claims or their equivalents in which I have endeavored to claim broadly all inherent novelty.

I claim:

1. Process of making green petroleum sulphonic acids formed by the action of sulphuric acid on a petroleum oil and containing sulphuric acid soluble in hydrocarbon oils, which comprises freeing said green petroleum sulphonic acids from sulphuric acid and homogeneously mixing the same with mahogany petroleum sulphonic acids, limiting the water content to not exceeding 30% of the total.

2. Process of making green petroleum sulphonic acids formed by the action of sulphuric acid on a petroleum oil and containing sulphuric acid soluble in hydrocarbon oils, which comprises freeing said green petroleum sulphonic acids from sulphuric acid and homogeneously mixing the same with mahogany petroleum sulphonic acids, limiting the water content to not exceeding 30% of the total, said mahogany petroleum sulphonic acids constituting not less than 10% of the total petroleum sulphonic acids.

3. Process of dissolving green petroleum sulphonic acids formed by the action of sulphuric acid on a petroleum oil and containing sulphuric acid in hydrocarbon oils, which comprises freeing said green petroleum sulphonic acids from sulphuric acid and homogeneously mixing green petroleum sulphonic acids with mahogany petroleum sulphonic acids, limiting the water content to not exceeding 30% of the total mixture of soaps, and dissolving the mixture so produced in a hydrocarbon oil.

4. Process of dissolving green petroleum sulphonic acids formed by the action of sulphuric acid on a petroleum oil and containing sulphuric acid in hydrocarbon oils, which comprises freeing said green petroleum sulphonic acids from sulphuric acid and homogeneously mixing the green petroleum sulphonic acids with mahogany petroleum sulphonic acids, limiting the water content to not exceeding 30% of the total mixture of soaps, said mahogany petroleum sulphonic acids being present to the extent of not less than 10% of the soaps present in said mixture, and dissolving the mixture so produced in a hydrocarbon oil.

5. A new composition of matter, comprising green petroleum sulphonic acids substantially free from sulphuric acid homogeneously mixed with mahogany petroleum sulphonic acids containing not more than 30% of water and characterized by solubility in petroleum oils.

6. A new composition of matter, comprising green petroleum sulphonic acids substantially free from sulphuric acid combined with a base homogeneously mixed with mahogany petroleum sulphonic acids containing not more than 30% of water and characterized by solubility in petroleum oils.

7. A new composition of matter, comprising green petroleum sulphonic acids substantially free from sulphuric acid homogeneously mixed with mahogany petroleum sulphonic acids, said mahogany petroleum sulphonic acids constituting from 10 to 90% of the total petroleum sulphonic acids, said mixture containing not more than 30% of water and being characterized by solubility in petroleum oils.

8. A new composition of matter, comprising green petroleum sulphonic acids substantially free from sulphuric acid combined with an alkali metal or ammonium base, homogeneously mixed with mahogany petroleum sulphonic acids combined with a base, said mahogany petroleum sulphonic acids constituting from 10 to 90% of the total petroleum sulphonic acids free or combined, said mixture containing not more than 30% of water and being characterized by solubility in petroleum oils.

9. Process of making soluble in hydrocarbon oils the green petroleum sulphonic acids derived from the treatment of mineral oil with sulphuric acid and containing non-acid organic compounds, which comprises separating the sulphonic acids from the non-acid organic compounds by subjecting the material to the action of an aqueous solution of an alcohol of not exceeding 3 carbon atoms, in which solution the sulphonic acids are selectively soluble and the non-acid organic compounds are relatively insoluble notwithstanding the presence of the organic acids, thereby separating the green petroleum sulphonic acids from the non-acid organic compounds, and thereafter homogeneously mixing the separated sulphonic acids with mahogany petroleum sulphonic acids to form a mixture containing not more than 30% of water, the said green and mahogany sulphonic acids being combined with an alkali metal or ammonium base.

10. Process of dissolving in hydrocarbon oils green petroleum sulphonic acids derived from the treatment of a petroleum oil with sulphuric acid and containing non-acid organic compounds, which comprises subjecting the material to the action of an aqueous solution of an alcohol of not exceeding 3 carbon atoms, in which the green petroleum sulphonic acids are soluble and the non-acid organic compounds are insoluble notwithstanding the presence of the green petroleum sulphonic acids, thereby separating the green petroleum sulphonic acids from the non-acid organic compounds, thereafter homogeneously mixing the green petroleum sulphonic acids with mahogany petroleum sulphonic acids while limiting the water content to not exceeding 30% of the total, and dissolving the mixture so produced in a hydrocarbon oil, the said green and mahogany petroleum sulphonic acids being combined with an alkali metal or ammonium base.

11. Process of making green petroleum sulphonic acids, formed by the action of sulphuric acid on a petroleum oil and containing sulphuric acid, soluble in hydrocarbon oils, which comprises freeing said sulphonic acids from sulphuric acid, thereafter combining said acids with an alkali metal or ammonium base, thereby forming the corresponding salts of said green petroleum sulphonic acids, combining mahogany petroleum sulphonic acids with an alkali metal or ammonium base, thereby forming the corresponding salts of said mahogany petroleum sulphonic acids, and homogeneously mixing the said salts of mahogany and green petroleum sulphonic acids while limiting the water content to not exceeding 30% of the total.

12. Process of making green petroleum sulphonic acids, formed by the action of sulphuric acid on a petroleum oil and containing sulphuric acid, soluble in hydrocarbon oils, which comprises freeing said green petroleum sulphonic acids from sulphuric acid, thereafter combining the same with an alkali metal or ammonium base, thereby forming the corresponding salts of said green petroleum sulphonic acids, combining mahogany petroleum sulphonic acids with an alkali metal or ammonium base, thereby forming the corresponding salts of said mahogany petroleum sulphonic acids, homogeneously mixing the salts of said green petroleum sulphonic acids with the salts of said mahogany petroleum sulphonic acids while limiting the water content to not exceeding 30% of the total, said mahogany petroleum sulphonic acids constituting not less than 10% of the total petroleum sulphonic acids.

13. Process of dissolving in hydrocarbon oils green petroluem sulphonic acids formed by the action of sulphuric acid on a petroleum oil and containing sulphuric acid, which comprises freeing said green petroleum sulphonic acids from sulphuric acid, thereafter combining the same with an alkali metal or ammonium base, thereby forming the corresponding salts of said green petroleum sulphonic acids, combining mahogany petroleum sulphonic acids with an alkali metal or ammonium base, thereby forming the corresponding salts of said mahogany petroleum sulphonic acids, homogeneously mixing the salts of said green petroleum sulphonic acids with the salts of said mahogany petroleum sulphonic acids while limiting the water content to not exceeding 30% and dissolving the mixture so produced in a hydrocarbon oil.

14. Process of dissolving in hydrocarbon oils green petroleum sulphonic acids formed by the action of sulphuric acid on a petroleum oil and containing sulphuric acid, which comprises freeing said green petroleum sulphonic acids from sulphuric acid, thereafter combining the same with an alkali metal or ammonium base, thereby forming the corresponding salts of said green petroleum sulphonic acids, combining mahogany petroleum sulphonic acids with an alkali metal or ammonium base, thereby forming the corresponding salts of said mahogany petroleum sulphonic acids, homogeneously mixing the salts of said green petroleum sulphonic acids with the salts of said mahogany petroleum sulphonic acids while limiting the water content to not exceeding 30% of the total, said mahogany petroleum sulphonic acids being present to the extent of not less than 10% of the petroleum sulphonic acids free or combined present in said mixture, and dissolving the mixture so produced in a hydrocarbon oil.

KOLACHALA SEETA RAMAYYA.